(12) United States Patent
Myerscough

(10) Patent No.: US 11,465,366 B2
(45) Date of Patent: Oct. 11, 2022

(54) QUICK RELEASE LEASH

(71) Applicant: OCEAN RODEO SPORTS INC., Victoria (CA)

(72) Inventor: Reece Myerscough, Tofino (CA)

(73) Assignee: OCEAN RODEO SPORTS INC., British (CA)

(*) Notice: Subject to any disclaimer, the term of this patent is extended or adjusted under 35 U.S.C. 154(b) by 215 days.

(21) Appl. No.: 17/061,863

(22) Filed: Oct. 2, 2020

(65) Prior Publication Data
US 2021/0100219 A1    Apr. 8, 2021

Related U.S. Application Data

(60) Provisional application No. 62/909,509, filed on Oct. 2, 2019.

(51) Int. Cl.
| | |
|---|---|
| B29C 65/58 | (2006.01) |
| B64D 17/32 | (2006.01) |
| A44B 99/00 | (2010.01) |
| A01K 27/00 | (2006.01) |
| F16B 21/16 | (2006.01) |
| B63B 32/73 | (2020.01) |

(52) U.S. Cl.
CPC .......... *B29C 65/58* (2013.01); *A01K 27/003* (2013.01); *A01K 27/005* (2013.01); *A44B 99/005* (2013.01); *B64D 17/32* (2013.01); *F16B 21/16* (2013.01); *B63B 32/73* (2020.02)

(58) Field of Classification Search
CPC ......... B63B 32/73; F16B 21/16; B64D 17/32; A44B 99/005; A01K 27/003; A01K 27/005; B29C 65/58

USPC ................ 441/441, 74, 75; 24/24, 573.11
See application file for complete search history.

(56) References Cited

U.S. PATENT DOCUMENTS

| | | | | |
|---|---|---|---|---|
| 5,375,561 A | * | 12/1994 | Gundersen | A01K 1/04 119/771 |
| 5,531,622 A | * | 7/1996 | Nealy | B63B 32/73 441/75 |
| 5,564,729 A | * | 10/1996 | Gomez | A63C 11/00 280/809 |
| 6,932,027 B1 | * | 8/2005 | Whitney | A01K 27/00 119/770 |
| 7,757,639 B1 | * | 7/2010 | Prendes | A01K 27/003 119/772 |

* cited by examiner

Primary Examiner — Daniel V Venne
(74) Attorney, Agent, or Firm — Finch & Maloney PLLC; Jay S. Franklin; Michael J. Bujold

(57) ABSTRACT

A quick release leash which includes a flexible leash line that terminates in a male member of a quick release coupling. The quick release coupling has a female receiver which receives the male member in mating relation. A locking pin passage that intersects the female receiver. The male member of the quick release coupling has an aperture. A locking pin is axially movable in the locking pin passage and is biased by a biasing member into engagement with the aperture of the male member. When a force is exerted upon a manual release sufficient to overcome the biasing force of biasing member, the first end of the locking pin is withdrawn from the aperture of the male member and the male member is released. This quick release leash was developed as a safety device for water sports to quickly release a person from their board, but has wider application.

10 Claims, 4 Drawing Sheets

QUICK RELEASE LEASH

FIELD

The present application relates to a leash with a quick release mechanism that was developed for use with board leashes, used in sports such as surfing and kite boarding. It is now realized that this quick release leash has wider application to leashes used with dogs and other animals and leashes used with equipment, such as cameras.

BACKGROUND

Board leashes are commonly used in sports such as surfing, and kite boarding to keep the riders attached to their boards or kites in the event of a planned or accidental separation from the piece of equipment. If the equipment is not attached via a leash, the user can lose the equipment leaving them in peril or the equipment can become a loose object that can strike other participants or bystanders.

State of the art leashes in surfing typically consist of a solid urethane line, commonly referred to as a leash line, which is made in a similar length as the board being used. This leash is connected to the ankle or wrist of the surfer by means of a multi wrap around cuff using overlapping sections of hook and loop fastener such as is sold under the Trademark name "Velcro". The common method to attach and remove a surf leash is by the user wrapping a Velcro cuff around their ankle or wrist, and to remove by peeling the Velcro strap apart by grasping an edge or tab on the Velcro strap. In perfect conditions, such as on the beach, a leash ankle strap, as described, can be removed by one hand, however it always requires two hands to reset said ankle strap which is a difficult task while surfing or kiteboarding.

There are times when it's necessary for the user to quickly release the leash from their ankle or wrist, and the action of finding the Velcro tab can be very difficult. The angle of pull is not ideal to peel away a Velcro cuff while riding or swimming making several attempts necessary to disengage the user from the cuff. In cold water conditions, surfers and kiteboarders wear gloves, losing the dexterity in their fingertips to hold and pull small fabric tabs used on most leashes.

Although there are leashes currently available for the above mentioned sports, they cannot be quickly disconnected by the user. Without the ability to quickly disconnect, elastic recoil, hang ups in the water or on land, or tangles with other equipment may harm the user.

SUMMARY

There is provided a quick release leash which includes a flexible leash line having a first end and a second end. At least one of the first end or the second end of the leash line terminates in a male member of a quick release coupling. The male member has a leash line attachment end and a remote end. A first connector is provided at the first end of the leash line for connection to a person. A second connector at the second end of the leash line for connection to an object. A housing of the quick release coupling is mounted to at least one of the first connector or the second connector. The housing has a female receiver which receives the male member in mating relation. The housing of the quick release coupling has a locking pin passage that intersects the female receiver. The male member of the quick release coupling has an aperture. The remote end of the male member and the female receiver have compatible cross-sectional profiles which align the aperture of the male member with the locking pin passage when the male member and the female receiver are in mating engagement. A locking pin being positioned in the locking pin passage. The locking pin has a first end and a second end. The locking pin is axially movable in the locking pin passage. A biasing member is mounted to the housing biasing the locking pin toward the female receiver to bring the first end of the locking pin into engagement with the aperture of the male member, thereby locking the male member within the housing. A manual release is attached to the second end of the locking pin. When a force is exerted upon the manual release sufficient to overcome the biasing force of biasing member, the first end of the locking pin is withdrawn from the aperture of the male member and the male member is released. A travel limiter is provided between the housing and the locking pin. The travel limiter limits travel of the locking pin to prevent the locking pin from being withdrawn from the locking pin passage.

With the quick release leash, as described above, a quick pull on the release results in the first end of the locking pin being withdrawn from the aperture of the male member and the male member being released.

The current state of the art for the opposing end of the leash, or board end of the leash, has similar deficiencies as described above in the function of the user end of the leash. The board connection is typically a hook and loop strap that feeds through a small loop of line attached to the board. A leash plug is built into the surfboard or kiteboard, and typically located at the tail of a board. The current method to remove a leash from a board is a two handed manual process requiring working the strap through the loop and setting the Velcro straps in place. There is no quick connect or quick release feature located at the board end of a leash to the writer's knowledge, and certainly no quick connect or quick release that can be operated with one hand. Such an innovation at the board end of the leash would allow users to quickly change boards while using the same leash, or even in some emergency situations offer secondary safety release if the user cannot reach his ankle quick release. Such situations do occur in kiteboarding. An example of where a board end leash release would be used is if the user's board is thrown through the lines of the kite, typically by a breaking wave or recoil snapback from the leash. The board is often facing the user in a perilous position and within reach to activate a quick release on the board end of the leash. For this reason it is preferred that both the first end and the second end of the leash line terminate in the male member of the quick release coupling, with a first male member at the first end and a second male member at the second end. To function properly, the housing of the quick release coupling is mounted to both the first connector and the second connector, with a first housing on the first connector and a second housing on the second connector.

There currently is not a leash system that allows both a one handed release and one handed reset that leaves the cuff of the leash secured to the user, while only releasing the leash. In order to facilitate one handed reset it is preferred that the remote end of the male member is wedge shaped and the first end of the locking pin is wedge shaped. When the remote end of the male member encounters the first end of the locking pin upon insertion into the female receiver, the wedge shaped remote end of the male member cooperates with the wedge shaped first end of the locking pin to lift the locking pin during penetration of the male member. The male member slides along the female receiver until the locking pin is aligned with the aperture in the male member, wherein the biasing force of the biasing member causes the first end of the locking pin to engage the aperture in the male member.

The preferred form of biasing member to bias the locking pin is a miniature elastic member, commonly known as a "bungee cord". The locking pin has an attachment aperture at the second end. The elastic member has a first end and a second end. The first end of the elastic member attaches to a first side of the housing, the elastic member extends through the attachment aperture of the locking pin and the second end of the elastic member attaches to a second side of the housing.

The preferred form of travel limited is a limit pin that cooperates with an axially oriented elongated slot on the locking pin. The limit pin is secured to the housing and extends through the elongated slot.

The preferred version of the quick release leash with a single handed quick release and single handed quick reset offers improved safety in sports like surfing and kite surfing where the users other hand is used to hold a board or kite, leaving only one hand free. However, it will be appreciated that there are other applications. The single handed quick release described below can also be used as a pet leash on animals such as dogs. There are currently no quick release animal leashes that can be attached to an animal collar with one motion from the operator. Animals often move around and wiggle while people attempt to connect leash ropes to small rings on animal collars making the task difficult. By using the single handed quick release and single handed quick reset system, the user can easily connect or disconnect a restless and moving animal to a leash or restraint in one motion. The single handed quick release described below can also be used as an object mount for objects that require quick and easy attachment or detachment to another object or part, such as video cameras and picture cameras.

These features and other aspects will hereafter be described in the description which follows.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
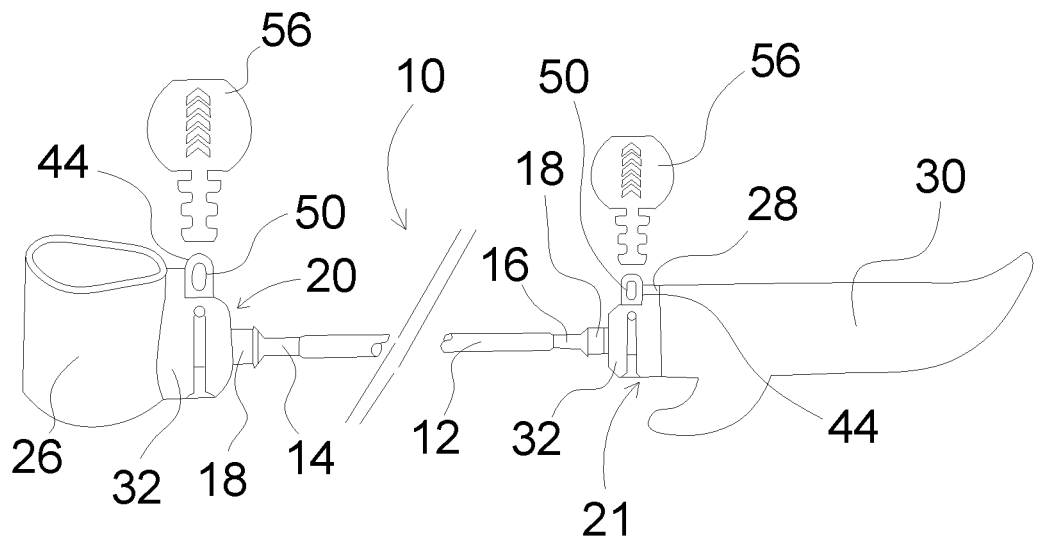
FIG. 1 is a side elevation view of a quick release leash.

A quick release leash generally identified by reference numeral 10, will now be described with reference to FIG. 1 through FIG. 8.

Figure 6:
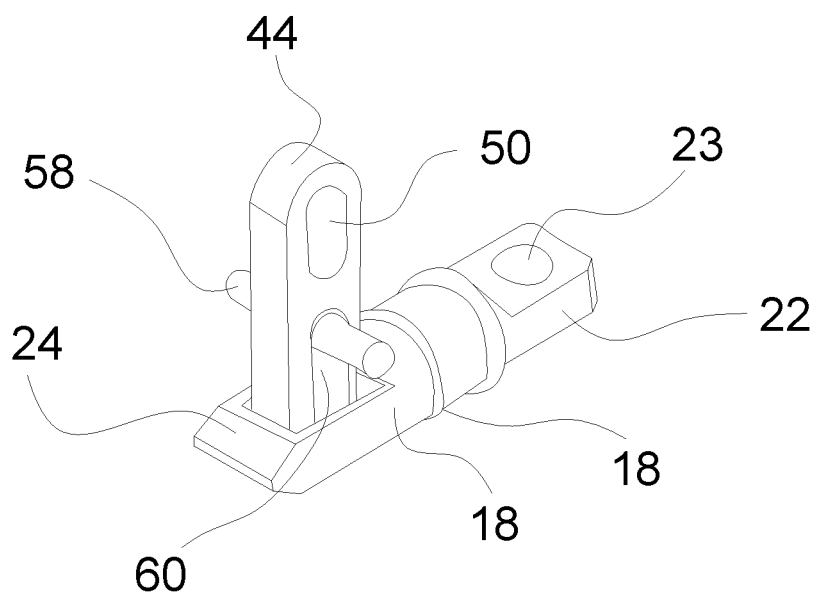
FIG. 6 is a perspective view of male member and locking pin with housing removed.

Structure and Relationship of Parts:

Referring to FIG. 1, quick release leash 10 includes a flexible leash line 12 having a first end 14 and a second end 16. First end 14 of leash line 12 terminates in a male member 18 of a first quick release coupling 20. Although a male member for a quick release coupling can be placed at either first end 14 or second end 16. It is preferred that male member 18 be positioned at both first end and second end. Therefore, illustrated is second end 16 of leash line 12 terminating in a male member 18 of a second quick release coupling 21. Referring to FIG. 6, each male member 18 has a leash line attachment end 22 and a remote end 24. There is an aperture 23 at leash line attachment end 22 that is used to receive fasteners that are used to secure leash line 12 to male member 18.

Referring to FIG. 1, a first connector 26 at first end 14 of leash line 12 is provided for connection to a person and a second connector 28 at second end 16 of leash line 12 is provided for connection to an object 30. First connector 26 has been illustrated as a cuff, as this is the most common form of connector used in water sports. It will be appreciated that first connector 26 can take a number of other forms. A board used in water sports has been selected for illustration (not to scale) as object 30, as this was the original application for quick release leash 10. It will be appreciated that there are any number of objects for which a leash is used that could have been chosen for illustration. A housing 32 of quick release coupling 20 is mounted to first connector 26. A housing 32 of quick release coupling 21 is mounted to second connector 28. In the description which follows, it will be understood that the components and operation of quick release coupling 20 and quick release coupling 21 are the same.

Figure 4:
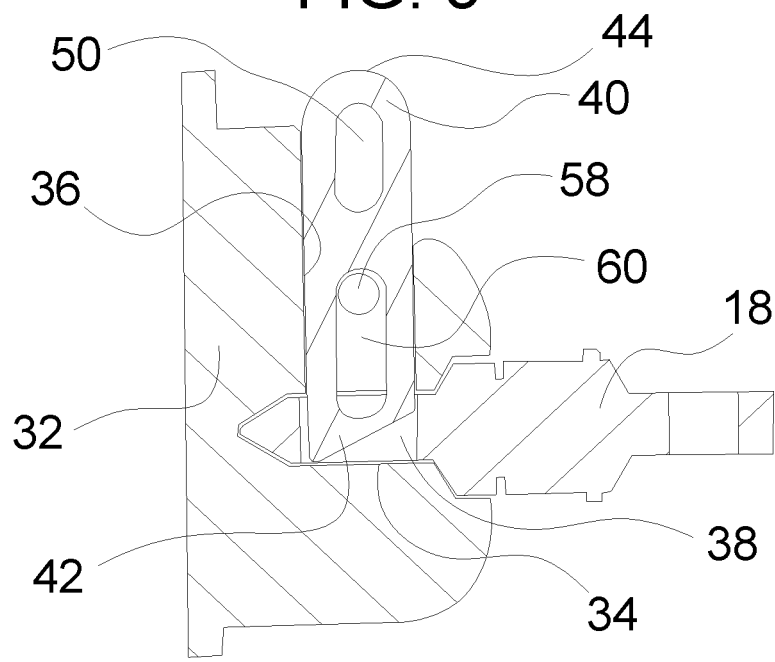
FIG. 4 is a section view of the quick release coupling of FIG. 3.
Figure 7:
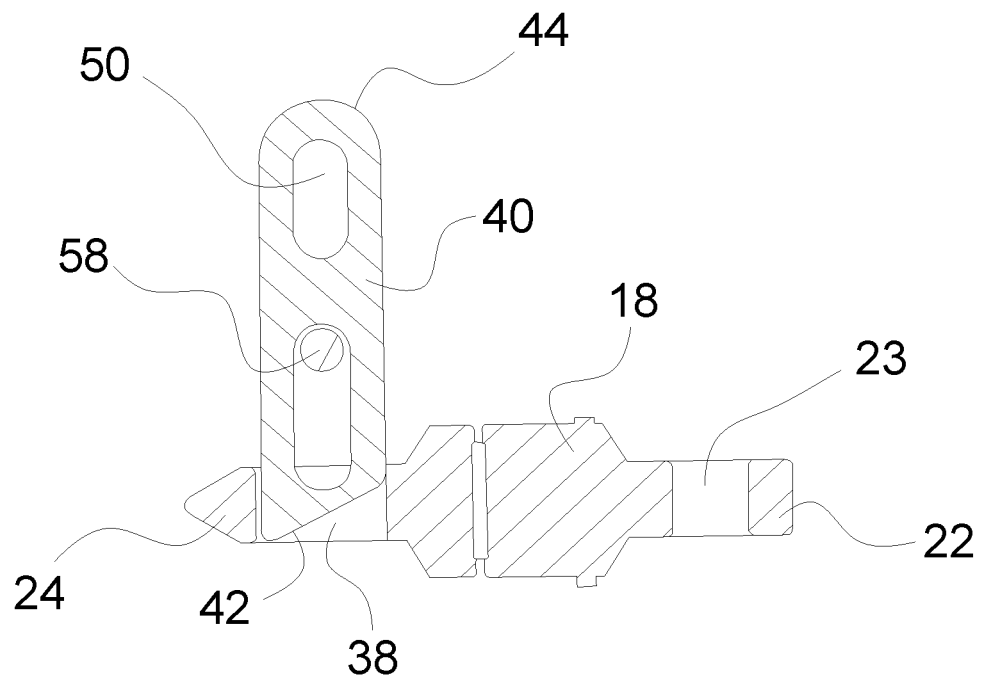
FIG. 7 is a section view of the male member and locking pin of FIG. 6 quick release coupling for FIG. 2.

Referring to FIG. 4, housing 32 has a female receiver 34 which receives remote end 24 of male member 18 in mating relation. Housing 32 has a locking pin passage 36 that intersects female receiver 34. Referring to FIG. 6 and FIG. 7, male member 18 has an aperture 38. Referring to FIG. 6 and FIG. 4, remote end 24 of male member 18 and female receiver 34 have compatible cross-sectional profiles, which align aperture 38 of male member 18 with locking pin passage 36 when male member 18 and female receiver 34 are in mating engagement.

Referring to FIG. 4, a locking pin 40 is positioned in locking pin passage 36. Locking pin 40 has a first end 42 and a second end 44. Locking pin 40 is axially movable in locking pin passage 36.

Figure 2:
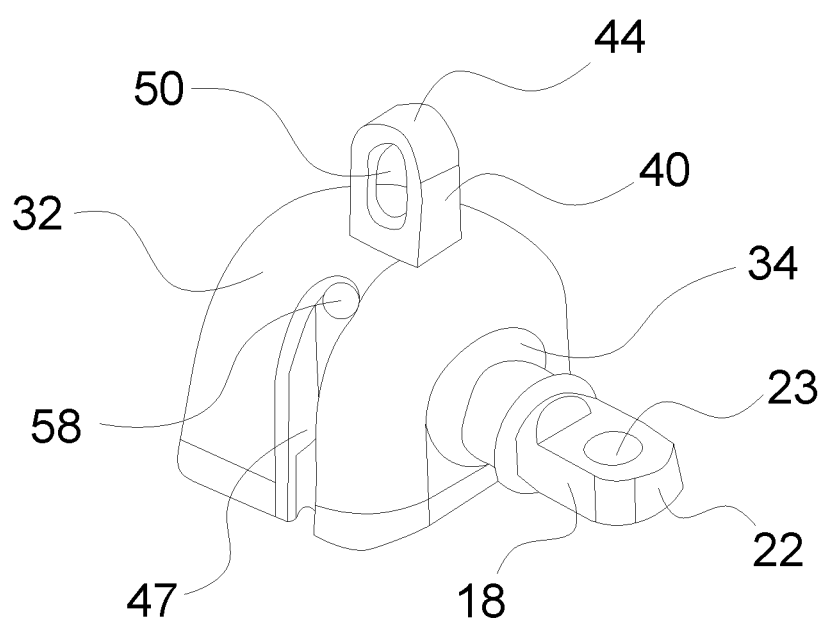
FIG. 2 is a perspective view of a quick release coupling for the quick release leash of FIG. 1.
Figure 3:
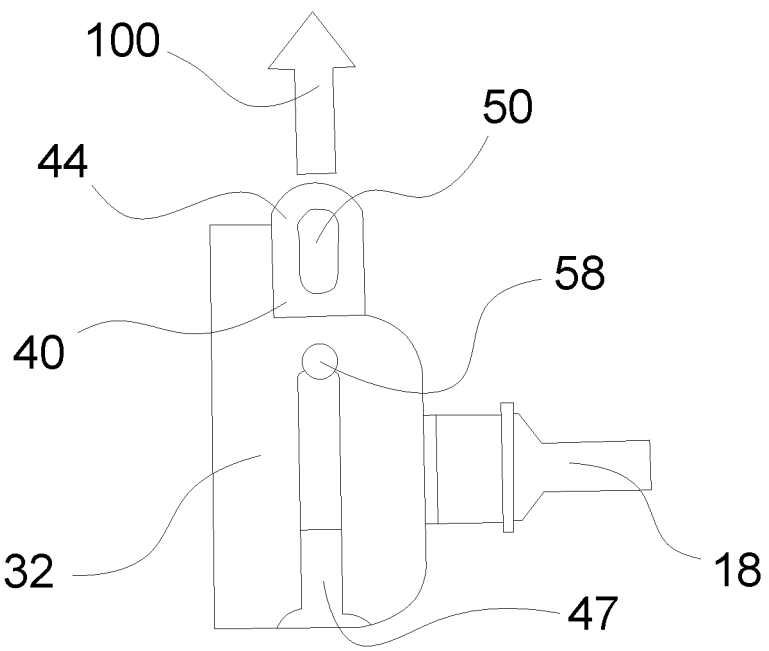
FIG. 3 is a side elevation view of the quick release coupling of FIG. 2.
Figure 5:
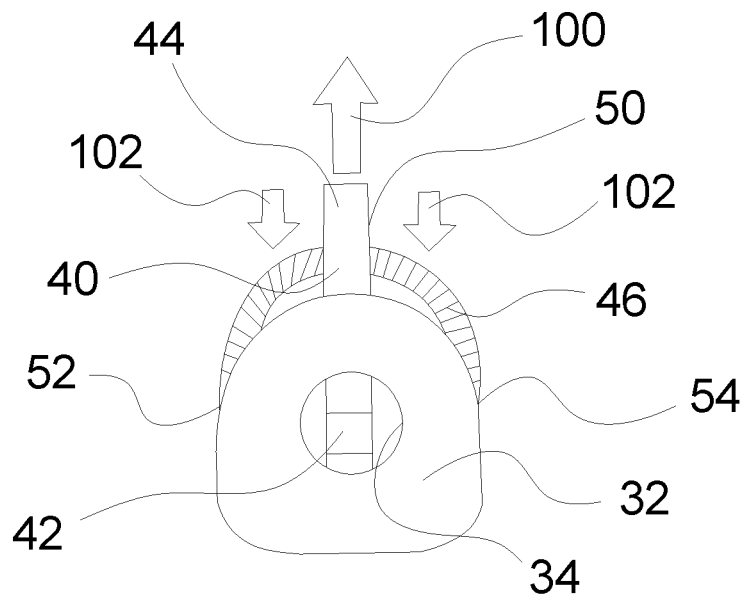
FIG. 5 is a transverse section view of the quick release coupling of FIG. 3.

Referring to FIG. 5, a biasing member 46 is mounted to housing 32 and biases locking pin 40 toward female receiver 34. Referring to FIG. 4, this biasing by biasing member 46 brings first end 42 of locking pin 40 into engagement with aperture 38 of male member 18, thereby locking male member 18 within housing 32. The form of biasing member 46 that has been chosen for illustration is an elastic member, commonly known as a "bungee cord". This bungee cord is sized to fit the application. Referring to FIG. 2 and FIG. 3, slots 47 are provided in housing 32 to accommodate installation of biasing member 46. Referring to FIG. 3, locking pin 40 has an attachment aperture 50 at second end 44 Referring to FIG. 5, biasing member 46 has a first end 52 and a second end 54. First end 52 of biasing member 46 is attached to a first side of housing 32. The biasing member 46 extends through attachment aperture 50 of locking pin 40, with second end 54 of biasing member 46 is attached to a second side of housing 32. There are other forms of biasing member 46 that could be used. However, an elastic member, such as a bungee cord is best for water sports where the biasing member will be frequently immersed in water.

Referring to FIG. 1, a manual release 56 is attached to second end 44 of locking pin 40. Referring to FIG. 3 and FIG. 4, when a force (represented by arrow 100) is exerted upon manual release 56 sufficient to overcome the biasing force (represented by arrows 102) of biasing member 46 (illustrated in FIG. 5), first end 42 of locking pin 40 is withdrawn from 38 aperture of male member 18 and male member 18 is released. Manual release 56 has been illustrated as a pull tab, as pull tabs are well known. This pull tab should be made large enough to be readily grasped by a person wearing gloves. Referring to FIG. 3, as described above, locking pin 40 has attachment aperture 50 at second end 44, it is to attachment aperture 50 that manual release 56 (in the form of the pull tab) attaches. It will appreciated that manual release 56 may take other forms.

Referring to FIG. 3 and FIG. 4, a travel limiter 58 is provided between housing 32 locking pin 40. Travel limiter 58 limits travel of locking pin 40 to prevent locking pin 40 from being withdrawn from locking pin passage 36. Referring to FIG. 4, locking pin 40 has an axially oriented elongated slot 60. Travel limiter 58 is a pin secured to housing 32 that extends through elongated slot 60. It will be appreciated that travel limiter 58 could take other forms. For example, there could be shoulders on locking pin 40 which engage with shoulders on housing 32 to limit travel.

It will be appreciated that manual release 56 facilitates single handed quick release. However, it is also highly desirable to have a mechanism to facilitate single handed quick reset. Referring to FIG. 6 and FIG. 7, it is preferred that remote end 24 of male member 18 is wedge shaped. It is also preferred that first end 42 of locking pin 40 is wedge shaped. When remote end 24 of male member 18 encounters first end 42 of locking pin 40, upon insertion into female receiver 34, the wedge shaped remote end 24 of male member cooperates with the wedge shaped first end 42 of locking pin 40. The engagement serves as an inclined plane to lift locking pin 40 during penetration of male member 18. Male member 18 slides along female receiver 34 until locking pin 40 is aligned with 38 aperture in male member 18, wherein the biasing force of biasing member 46 causes first end 42 of locking pin 40 to engage aperture 38 in male member 18.

Figure 8:
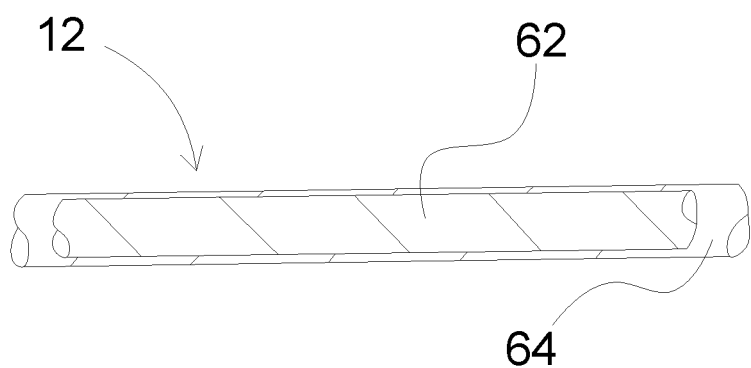
FIG. 8 is a section view of the leash line of FIG. 1.

Referring to FIG. 8, the preferred form of leash line 12 has a non-stretchable inner line 62 with an elasticized outer covering 64.

Operation:

Referring to FIG. 1, when in use first connector 26 (shown as being a cuff) at first end 14 of leash line 12 is connected to a person and second connector 28 at second end 16 of leash line 12 is connected to an object 30 (shown as being board). First quick release coupling 20 is mounted to first connector 26 and second quick release coupling 21 is mounted to second connector 28. Both first end 14 and second end of leash line 12 terminate in male members 18. Referring to FIG. 4, each male member 18 is positioned in female receiver 34 of housing 32 if one of first quick release coupling 20 and second quick release coupling 21. Referring to FIG. 6 and FIG. 7, male member 18 cannot be withdrawn from female receiver 34, because first end 42 of locking pin 40 extends through aperture 38 in male member. Referring to FIG. 5, biasing member 46 exerts a biasing force upon locking pin 40 to maintain locking pin 40 in a locking position.

A person using quick release leash 10 has the option of pulling manual release 56 on either first quick release coupling 20 or second quick release coupling 21, depending upon the circumstances. This is a single handed release. When a force is exerted upon manual release 56 sufficient to overcome the biasing force of biasing member 46 (illustrated in FIG. 5), first end 42 of locking pin 40 is withdrawn from 38 aperture of male member 18 and male member 18 is released. Locking pin 40 is able to move along locking pin passage 36 only to the extent accommodated by slot 60. At the end of slot 60, travel limiter 58 limits travel of locking pin 40 to prevent locking pin 40 from being withdrawn from locking pin passage 36.

In order to reset, male member 18 is reinserted into female receiver 34. When remote end 24 of male member 18 encounters first end 42 of locking pin 40, upon insertion into female receiver 34, the wedge shaped remote end 24 of male member cooperates with the wedge shaped first end 42 of locking pin 40. The engagement serves as an inclined plane to lift locking pin 40 during penetration of male member 18. Male member 18 slides along female receiver 34 until locking pin 40 is aligned with 38 aperture in male member 18, wherein the biasing force of biasing member 46 causes first end 42 of locking pin 40 to re-engage with aperture 38 in male member 18. This is a single handed quick reset.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A quick release leash, comprising:
   a flexible leash line having a first end and a second end;
   at least one of the first end or the second end of the leash line terminating in a male member of a quick release coupling, the male member having a leash line attachment end and a remote end;
   a first connector at the first end of the leash line for connection to a person;
   a second connector at the second end of the leash line for connection to an object;
   a housing of the quick release coupling mounted to at least one of the first connector or the second connector, the housing having a female receiver which receives the male member in mating relation;
   the housing of the quick release coupling having a locking pin passage that intersects the female receiver;
   the male member of the quick release coupling having an aperture, the remote end of the male member and the female receiver having compatible cross-sectional profiles which align the aperture of the male member with the locking pin passage when the male member and the female receiver are in mating engagement;
   a locking pin being positioned in the locking pin passage, the locking pin having a first end and a second end, the locking pin being axially movable in the locking pin passage;
   a biasing member mounted to the housing biasing the locking pin toward the female receiver to bring the first end of the locking pin into engagement with the aperture of the male member, thereby locking the male member within the housing;

a manual release being attached to the second end of the locking pin, such that when a force is exerted upon the manual release sufficient to overcome the biasing force of biasing member, the first end of the locking pin is withdrawn from the aperture of the male member and the male member is released; and a travel limiter being provided between the housing and the locking pin, the travel limiter limits travel of the locking pin to prevent the locking pin from being withdrawn from the locking pin passage.

2. The quick release leash of claim 1, wherein both the first end and the second end of the leash line terminate in the male member of the quick release coupling, with a first male member at the first end and a second male member at the second end and the housing of the quick release coupling is mounted to both the first connector and the second connector with a first housing on the first connector and a second housing on the second connector.

3. The quick release leash of claim 1, wherein leash line is comprised of a non-stretchable inner line with an elasticized outer covering.

4. The quick release leash of claim 1, wherein the first connector is a cuff.

5. The quick release leash of claim 1, wherein the release is a pull tab.

6. The quick release leash of claim 5, wherein the locking pin has an attachment aperture at the second end to which the pull tab attaches.

7. The quick release leash of claim 1, wherein the remote end of the male member is wedge shaped and the first end of the locking pin is wedge shaped, such that when the remote end of the male member encounters the first end of the locking pin upon insertion into the female receiver, the wedge shaped remote end of the male member cooperates with the wedge shaped first end of the locking pin to lift the locking pin during penetration of the male member, the male member sliding along the female receiver until the locking pin is aligned with the aperture in the male member wherein the biasing force of the biasing member causes the first end of the locking pin to engage the aperture in the male member.

8. The quick release leash of claim 1, wherein an elastic member is used as the biasing member.

9. The quick release leash of claim 8, wherein the locking pin has an attachment aperture at the second end and the elastic member has a first end and a second end, the first end of the elastic member attaching to a first side of the housing, the elastic member extending through the attachment aperture of the locking pin and the second end of the elastic member attaching to a second side of the housing.

10. The quick release leash of claim 1, wherein the locking pin has an axially oriented elongated slot, and the travel limiter is a pin secured to the housing that extends through the elongated slot.

* * * * *